United States Patent
Balachandran et al.

(10) Patent No.: US 8,832,180 B2
(45) Date of Patent: Sep. 9, 2014

(54) FUNCTION MODULE DISPATCHER

(75) Inventors: Biju Balachandran, Bangalore (IN); Maneesh Rawat, Bangalore (IN); Giridharan Somaskandan, Bangalore (IN)

(73) Assignee: SAP AG, Walldorf (DE)

( * ) Notice: Subject to any disclaimer, the term of this patent is extended or adjusted under 35 U.S.C. 154(b) by 407 days.

(21) Appl. No.: 12/981,497

(22) Filed: Dec. 30, 2010

(65) Prior Publication Data

US 2012/0174195 A1  Jul. 5, 2012

(51) Int. Cl.
  *G06F 15/16* (2006.01)
  *H04L 9/32* (2006.01)
  *G06F 21/31* (2013.01)
  *G06F 21/45* (2013.01)

(52) U.S. Cl.
  CPC ............... *G06F 21/45* (2013.01); *G06F 21/31* (2013.01)
  USPC ............ 709/203; 707/713; 707/716; 707/812

(58) Field of Classification Search
  None
  See application file for complete search history.

(56) References Cited

U.S. PATENT DOCUMENTS

| | | | | |
|---|---|---|---|---|
| 6,823,384 | B1 * | 11/2004 | Wilson et al. | 709/225 |
| 2009/0276405 | A1 * | 11/2009 | Weissman et al. | 707/3 |
| 2011/0247066 | A1 * | 10/2011 | Lee | 726/19 |
| 2011/0289140 | A1 * | 11/2011 | Pletter et al. | 709/203 |
| 2012/0054222 | A1 * | 3/2012 | Soby | 707/769 |
| 2012/0117509 | A1 * | 5/2012 | Powell et al. | 715/786 |

OTHER PUBLICATIONS

"Towards Fair Sharing of Block Storage in a Multi-Tenant Cloud"—Apr. 2010, Lin et al, University of Utah, School of Computing AT&T Labs  https://www.usenix.org/system/files/conference/hotcloud12/hotcloud12-final57.pdf.*

"A Comparison of Secure Multi-tenancy Architectures for File System Storage Clouds"—Kurmus et al, IBM Research, Aug. 2009 http://www.zurich.ibm.com/~cca/papers/scs.pdf.*

* cited by examiner

*Primary Examiner* — Randy Scott

(57) ABSTRACT

Disclosed are methods and systems for function module dispatcher. The methods and systems involve generating a multi tenant enabled function module by adding a logical tenant access parameter to a function to be executed in a tenant system. The methods and systems further include receiving access data associated with a central tenant system and input parameters for executing the function module on one or more tenant systems, accessing a central tenant system based on the access data, retrieving tenant access data associated with the tenant system by matching a logical tenant access parameter data received in the input parameters to the multi tenant function call with the tenant access parameter data stored in a destination map and dispatching the call to execute the function module on a respective tenant based on the tenant access data retrieved from the destination map.

19 Claims, 9 Drawing Sheets

```
                                                          ┌420
  Test for function group       S_LMCFG_TEST_CTC_ADAPTER
  Function Module               SCTC_TEST_BAPIRET2
  Upper case / Lower case       ☐

RFC target sys:               [                    ]

┌─────────────────────┬──────────────────────────────┐
  │ Import parameters   │ Value                        │
  ├─────────────────────┼──────────────────────────────┤
  │ TESTMODE            │ [MT              ]           │
  │ ADD_PARAMS          │ ▓X▓  ↖425                    │
  └─────────────────────┴──────────────────────────────┘
```

FIG. 4B

```
                                              ┌430
  ┌──────────────────────────────────────────────┐
  │ Program ZCTC_MT                              │
  ├──────────────────────────────────────────────┤
  │ ⊕                                            │
  ├──────────────────────────────────────────────┤
  │  F_NAME    [SCTC_TEST_BAPIRET2      ]        │
  │  TR_REQ    [BCEK226705              ]        │
  │  MT_NAME   [SCTC_TEST_BAPIRET2_MT_1 ] ↖435   │
  │  F_GRP     [S_LMCFG_TEST_CTC_MT     ]🗔      │
  └──────────────────────────────────────────────┘
```

FIG. 4C

FUNCTION MODULE DISPATCHER

FIELD

The field generally relates to function modules, and more specifically, the field relates to dispatching a request to execute function modules centrally for execution on tenant systems.

BACKGROUND

Generally, in a secured network environment, software function modules may be stored across several systems and executed on several tenant systems. Whenever a client system such as a Java® client wants to execute a function module on several tenant systems it has to access the tenant systems appropriately. However, the several tenant systems may have their own set of access parameters such as user name, password, host name and port name to login to the respective tenant systems. Further the client may also need to pass its own access parameters to connect to the several tenant systems. However, the various parties associated with the tenants may not want to share their access parameters across several tenant systems due to security concerns.

SUMMARY

Various embodiments of systems and methods for function module dispatcher are described herein. The methods and systems involve generating a multi tenant enabled function module by adding a logical tenant access parameter to the function.

According to one embodiment, access data associated with a central tenant system and input parameters for executing the function module on one or more tenant systems is received. The function module is stored at the central tenant system. The central tenant system is accessed based on the access data. The tenant access data associated with the tenant system is retrieved by matching a logical tenant access parameter data received in the input parameters to the multi tenant function call with the tenant access parameter data stored in a destination map. The request to execute the function module is then dispatched to a respective tenant based on the tenant access data retrieved from the destination map.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments, together with their advantages, may be best understood from the following detailed description taken in conjunction with the accompanying drawings.

FIGS. 4A to 4D illustrate exemplary user interfaces of a function module according to various embodiments.

DETAILED DESCRIPTION

Embodiments of techniques for function module dispatcher are described herein. In the following description, numerous specific details are set forth to provide a thorough understanding of various embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

A remote function module is an interface for communication between a client and a tenant. The remote function module may be used in several tenant systems. The same remote function module may be executed on the several systems based on a client request. A request from a client may be a remote function call to execute the function module stored at a central system on several tenant systems. The several tenant systems may have different tenant access data. In such cases, the remote function request may be dispatched by a multi tenant enabled function module. The multi tenant enabled function module retrieves the tenant access data associated with the tenant system by matching a logical tenant access parameter data received in the input parameters to the multi tenant function call with the tenant access parameter data stored in a destination map. The multi tenant enabled function module may be generated by adding a logical tenant access parameter to a regular function module. The logical tenant access parameter may be a destination parameter. The multi tenant enabled function module may have access to a destination map which includes a mapping of several logical tenant access parameters to tenant access data for several tenant systems. The tenant access data may be retrieved and used to connect to respective tenant systems. By using the logical tenant access parameter data in calling the multi tenant function, the client has no need for the tenant access data of various tenant systems.

Figure 1:
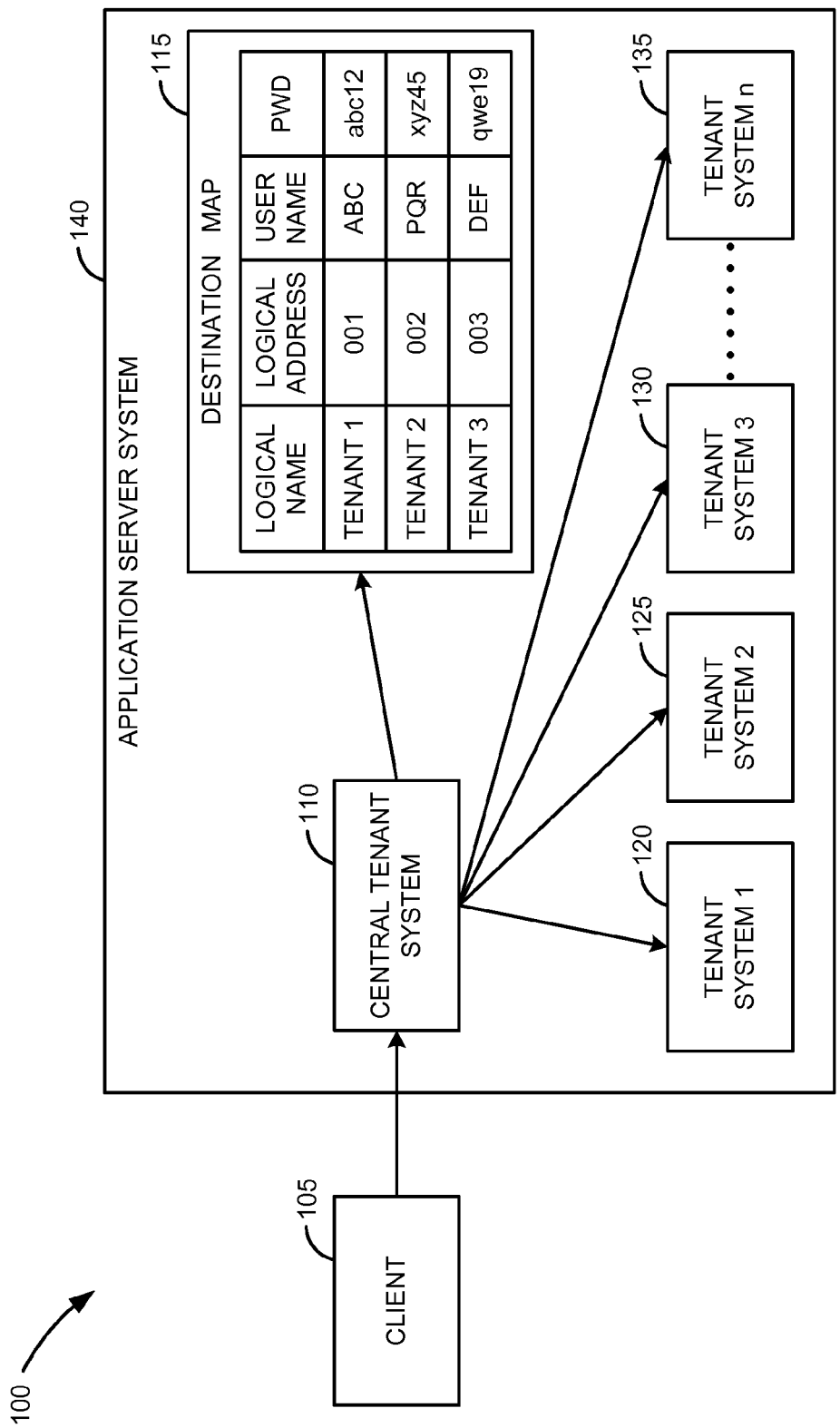
FIG. 1 is a block diagram illustrating an exemplary scenario for dispatching a request to execute function modules according to an embodiment.

FIG. 1 is a block diagram illustrating an exemplary scenario for dispatching a request to execute function module according to an embodiment. Consider a scenario 100, with a client 105, an application server system 140 including a central tenant system 110, destination map 115, and exemplary tenant systems such as tenant system 1 120, tenant system 2 125, tenant system 3 130 and tenant system n 135.

At configuration time, a function module stored at a central tenant system 110 is accessed based, for instance, by a request from a client 105 to execute the function module in one or more tenant systems 120, 125, 130, 135. A logical tenant access parameter is added to the function module stored at the central tenant system to convert the function module to a multi tenant enabled function module. The logical tenant access parameter may be implemented as an alpha numeric key according to which the tenant access data may be stored and retrieved in a destination map 115. On adding the tenant access parameter, the function module is enabled to be a multi tenant enabled function module. For instance, a function module for a user creation may include input parameters such as user type, user name and an associated password. A job creation function module may include input parameters such as job name and job frequency. The job creation function module may specify a job to backup a system at regular frequency. A logical tenant access parameter may be added to the user creation function module and job creation function module, which enables the respective function modules to be multi tenant enabled function modules.

According to one embodiment, the multi tenant enabled function module may dispatch the function module to execute it in several tenant systems such as tenant system 1 120, tenant system 2 125, tenant system 3 130 and tenant system n 135.

At a run time, the client 105 requests the central tenant system 110 to execute the function module in one or more tenant systems 120, 125, 130, 135. The request includes access data for central tenant system 110, which may include a host name, port name, user name and an associated password. The request may also include the input parameters of the function module along with a logical tenant access parameter associated with the tenant system on which the function module may be executed. The request is sent to the central tenant system 110. On receiving the request, the central tenant system 110 retrieves a tenant access data from destination map 115, based on the logical tenant access parameter in the request. The tenant access data may include a logical string, a logical address, user name and password of the tenant system on which the function module may be executed. Based on the retrieved tenant access data, the function module in the central tenant system 110 is dispatched to execute the function module on a respective tenant system.

Figure 2:
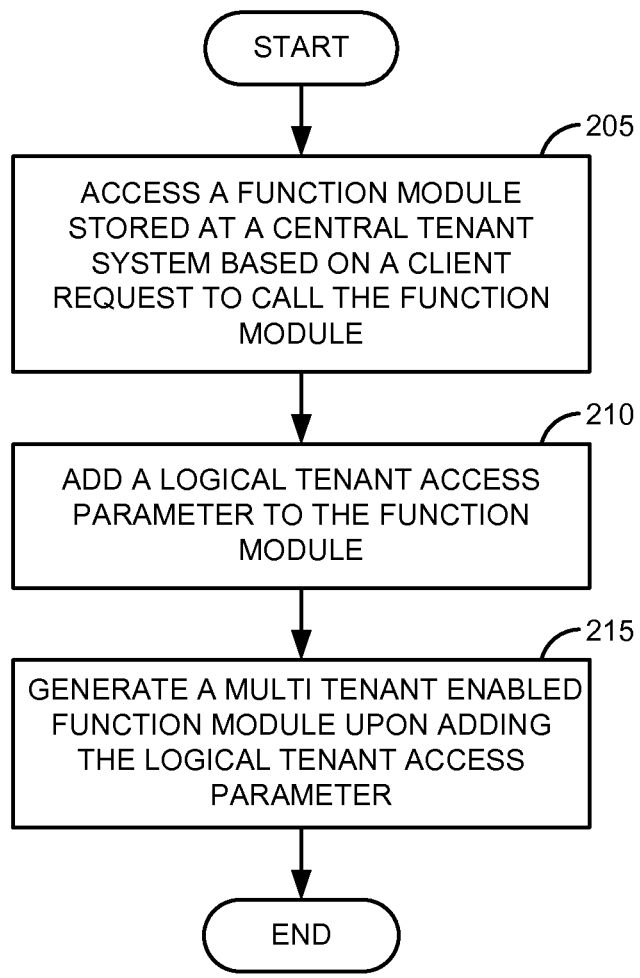
FIG. 2 is a flow diagram illustrating an exemplary method for generating a multi tenant enabled function module according to an embodiment.

FIG. 2 is a flow diagram illustrating an exemplary method for generating a multi tenant enabled function module according to an embodiment. At process block 205, a function module stored at a central tenant system may be accessed based on a client request to call the function module. The client request includes a request to execute the function module on tenant systems. At process block 210, a logical tenant access parameter is added to the function module associated with the request. The logical tenant access parameter may be a destination parameter. At process block 215, a multi tenant enabled function module is generated upon adding the logical tenant access parameter. The multi tenant enabled function module may be associated with a destination map storing tenant access data to dispatch the request to execute the function module on one or more tenant systems.

Consider a scenario of a function module for creating a user account in several tenant systems. The input parameters associated with the creation of the user may be user type, user name and password, and so on. Based on the input parameters, the user creation function module is generated and stored in the central tenant system. A logical tenant access parameter may be added to user creation function module. On adding the logical tenant access parameter, the user creation function module becomes a multi tenant enabled function module, which may be connected to a destination map storing tenant access data for several tenant systems.

Figure 3:
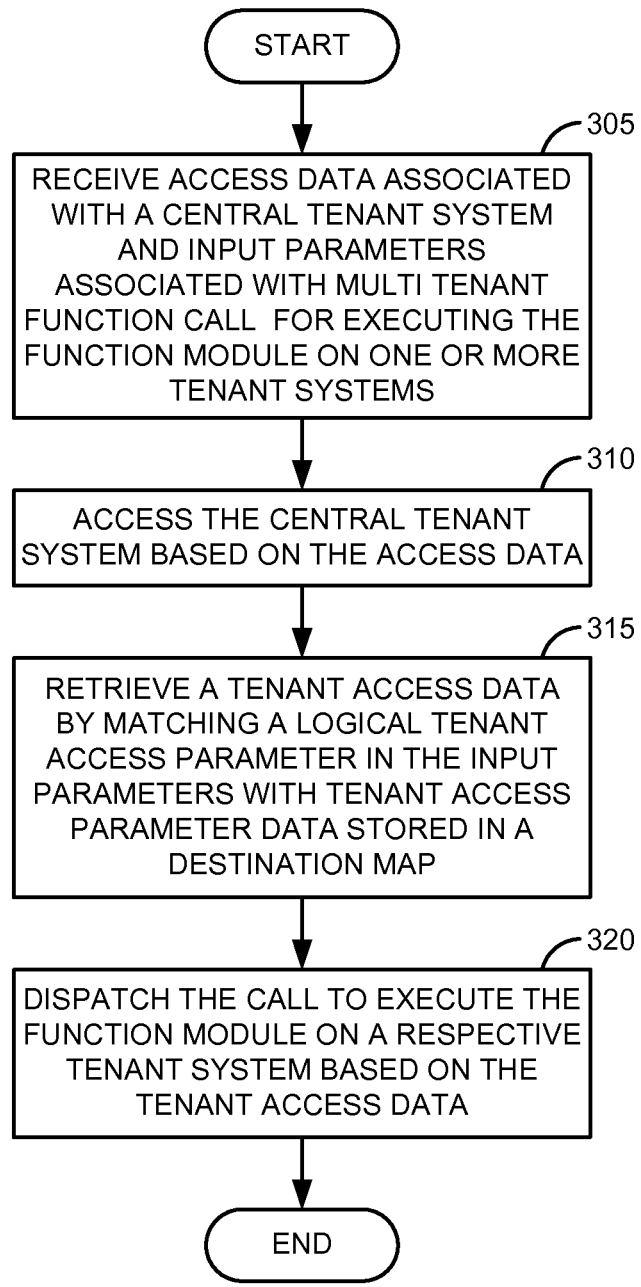
FIG. 3 is a flow diagram illustrating an exemplary method for dispatching a request to execute function modules on one or more tenant systems according to an embodiment.

FIG. 3 is a flow diagram illustrating an exemplary method for dispatching a request to execute function modules on one or more tenant systems according to an embodiment. At process block 305, access data associated with a central tenant system and input parameters associated with a multi tenant function call for executing the function module on one or more tenant systems are received. The multi tenant function call may a request for executing the function modules on one or more tenant systems. The function module may be stored in a central tenant system. The access data associated with the central tenant system may be host name, port name, user name and password. The input parameters may be parameters associated with the function module. The input parameters may also include a logical tenant access parameter of the tenant system according to which the function module may be dispatched to execute the function module. For instance, if a function module is related to user creation, the input parameters may be user type, user name, password and a logical tenant access parameter. At process block 310, the central tenant system is accessed based on the access data. At process block 315, a tenant access data associated with the tenant system is retrieved by matching the logical tenant access parameter in the input parameters to a tenant access parameter stored in a destination map. The logical tenant access parameter may be the name of the tenant system on which the function module may be executed. The logical tenant access parameter may be implemented as alpha numeric keys. The tenant access data in the destination map includes a logical string, logical address, user name and password associated with the tenant system. The logical string may be destination name and the logical address may be a destination address. The destination map may include tenant access data for several tenant systems. At process 320, the call to execute the function module on a respective tenant system based on the tenant access data is dispatched.

According to one embodiment, the destination map associated with the multi tenant enabled function module is configured by a system administrator. The system administrator may include the tenant access data in the destination map.

Figure 4A:
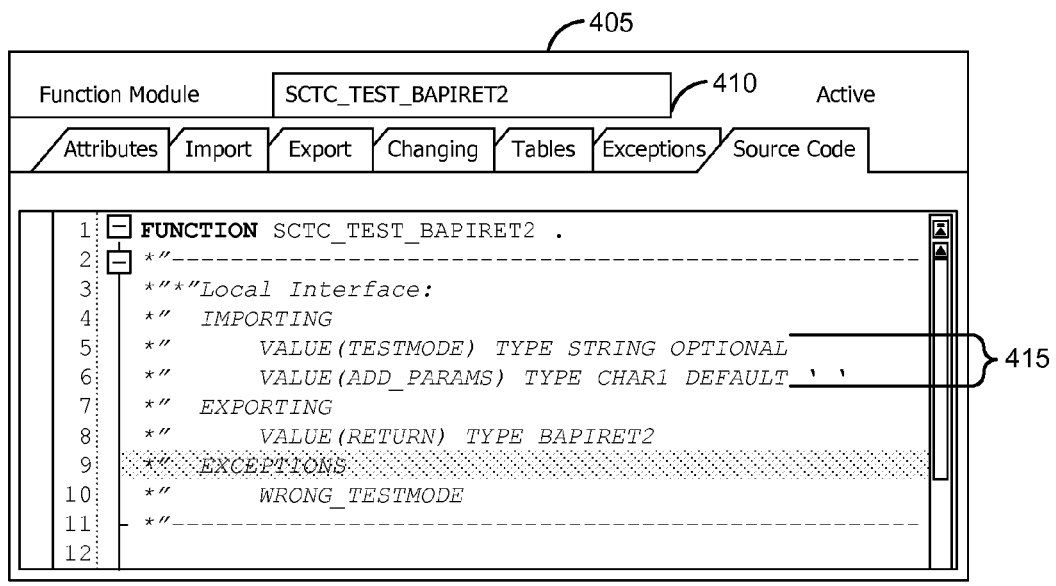
Figure 4D:
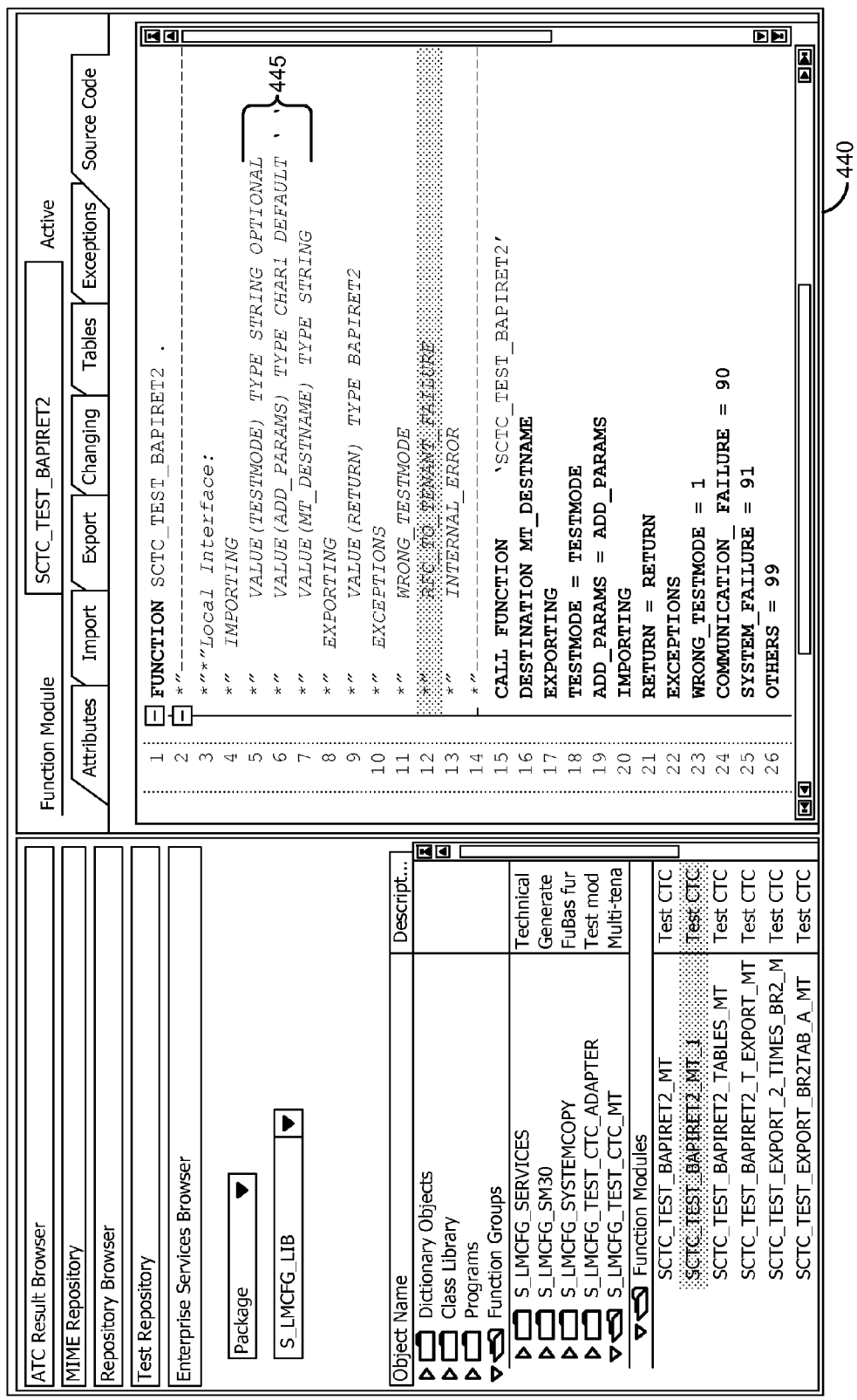

FIGS. 4A to 4D illustrate exemplary user interfaces of a function module according to various embodiments. FIG. 4A illustrates user interface 405 displaying two input parameters 415 associated with the function module 410 named as 'SCTC_TEST_BAPIRET2'. A request may be dispatched to execute a function module on several tenant systems. FIG. 4B illustrates user interface 420 adding a logical tenant access parameter 'X' 425 to the function module 'SCTC_TEST_BAPIRET2'. According to one embodiment, the logical tenant access parameter may be destination parameter. Adding the logical tenant access parameter 'X' 425 enables the function module to become a multi tenant enabled function module as shown in user interface 430 of FIG. 4C. The name of the multi tenant enabled function module is represented by 435. FIG. 4D illustrates a user interface 440 displaying destination parameter added to the function module represented by 445.

Figure 5:
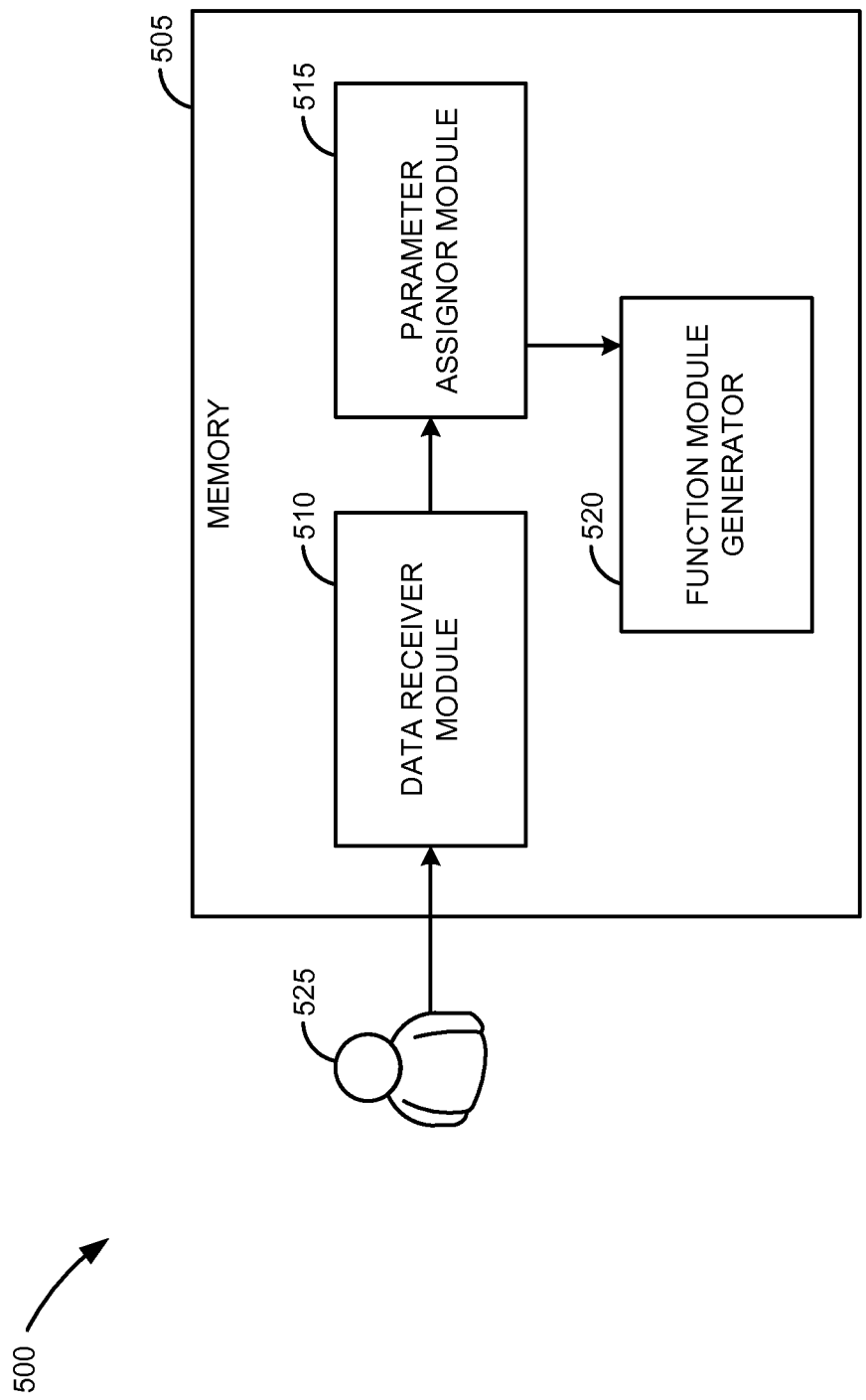
FIG. 5 is a block diagram illustrating a computer system for generating a multi tenant enabled function module.

FIG. 5 is a block diagram illustrating a computer system for generating a multi tenant enabled function module. The computer system 500 includes a memory 505 including a data receiver module 510, a parameter assignor module 515 and a function module generator 520. The data receiver module 510 receives a request from a user 525 for accessing a function module stored at a central tenant system. The user 525 may be a system administrator. A parameter assignor module 515 adds a logical tenant access parameter to the function module. The logical tenant access parameter may be a destination parameter. On adding the logical tenant access parameter, the function module generator 520 generates a multi tenant enabled function module.

Figure 6:
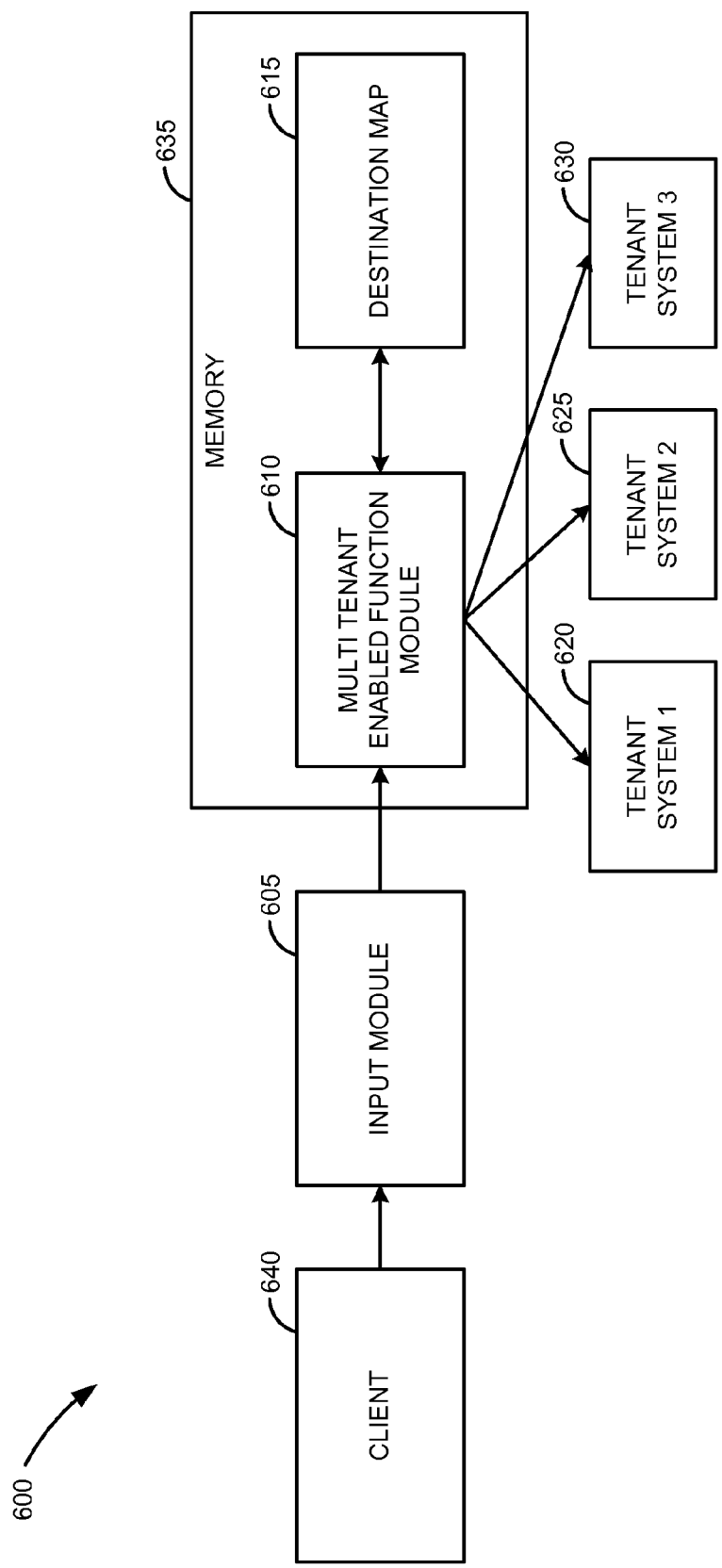
FIG. 6 is a block diagram illustrating a computer system for dispatching a request to execute function modules on one or more client tenant systems according to an embodiment.

FIG. 6 is a block diagram illustrating a computer system for dispatching a request to execute function modules to one or more central tenant systems according to an embodiment. The computer system 600 includes an input module 605 to receive access data associated with a central tenant system and input parameters to dispatch the function module stored in central tenant system to one or more tenant systems 620, 625, 630. According to an embodiment, the central tenant system may also include a function module. A memory 635 includes a multi tenant enabled function module 610 and a destination map 615. The multi tenant enabled function module 610 retrieves tenant access parameter data associated with the tenant system from a destination map 615. The tenant access data is retrieved by matching the logical tenant access parameter name in the input parameters associated with the multi tenant function call with the tenant access parameter data stored in a destination map 615. The multi tenant enabled function module 610 dispatches the request to execute the function module on the respective tenant system based on the tenant access data retrieved from the destination map 615.

For instance, consider a job creation function module that has to be dispatched for executing in tenant systems such as tenant system 1 620, tenant system 2 625, tenant system 3 630. The job creation function module may be present in a central tenant system. The central tenant system may receive a request at the input module 605 including access data and input parameters from a client 640. The access data and the input parameters are passed to the memory 635 of the central tenant system. The memory 635 of the central tenant system may include multi tenant enabled function module 610. On receiving the request, based on the destination name in the input parameters, the multi tenant enabled function module 610 retrieves tenant access parameter data from the destination map 615 relating to tenant system 1 620, tenant system 2 625 and tenant system 3 630. The multi tenant enabled function module 610 dispatches the job creation function module to tenant system 1 620, tenant system 2 625 and tenant system 3 630.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
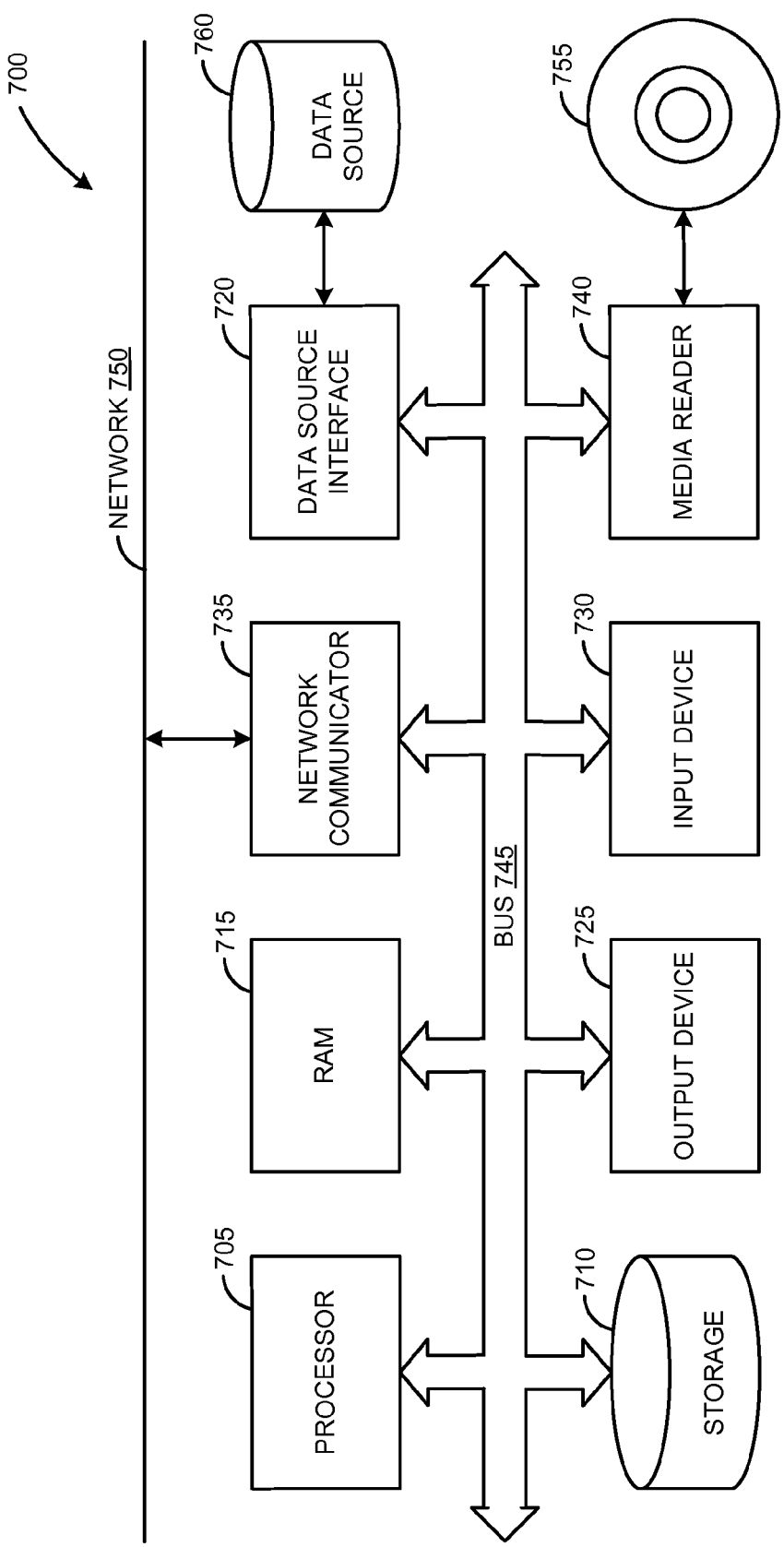
FIG. 7 is a block diagram of an exemplary computer system according an embodiment.

FIG. 7 is a block diagram of an exemplary computer system 700 according to an embodiment. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interacting with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however, that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   access a remote function module stored at a central tenant system based on a request from a client to call the remote function module, wherein the request includes input parameters and the remote function module is an interface for communication between the client and tenant systems;
   add a logical tenant access parameter to the remote function module, wherein the logical tenant access parameter is received in the input parameters associated with the request;
   upon adding the logical tenant access parameter, generate a multi-tenant enabled function module for executing in plurality of tenant systems;
   retrieve tenant access data associated with the plurality of tenant systems by matching the received logical tenant access parameter with tenant access parameters stored in a destination map, wherein the destination map comprises tenant access data comprising logical strings and logical addresses corresponding to the plurality of tenant systems; and
   based on the retrieved tenant access data, dispatch the generated multi-tenant enabled function module call to execute on the plurality of tenant systems.

2. The article of manufacture of claim 1, wherein the request from the client comprises access data associated with the central tenant system, wherein the access data comprises a host name, a port name, a user name and an associated password.

3. The article of manufacture of claim 1, wherein the instructions for retrieving the tenant access data further comprises instructions, which when executed by the computer, cause the computer to:
   retrieve user names and passwords associated with the plurality of tenant systems.

4. The article of manufacture of claim 1, wherein the instructions for retrieving the logical strings further comprises instructions, which when executed by the computer, cause the computer to:
   retrieve destination names.

5. The article of manufacture of claim 1, wherein the instructions for retrieving the logical addresses further comprises instructions, which when executed by the computer, cause the computer to:
   retrieve destination addresses.

6. The article of manufacture of claim 1, wherein the instructions for adding a logical tenant access parameter further comprises instructions, which when executed by the computer, cause the computer to:
   add a destination parameter.

7. The article of manufacture of claim 1, wherein the input parameters are associated with the multi-tenant enabled function module.

8. A computer system for generating a multi-tenant enabled function module comprising:
   a processor;
   a memory in communication with the processor for storing:
      a data receiver module for receiving a request from a client for accessing a remote function module stored at a central tenant system, wherein the request includes input parameters and the remote function module is an interface for communication between the client and tenant systems;
      a parameter assignor module for adding a logical tenant access parameter to the remote function module, wherein the logical tenant access parameter is received in the input parameters associated with the request;
      a function module generator for generating a multi-tenant enabled function module for executing in plurality of tenant systems, based on the added logical tenant access parameter;
      the multi-tenant enabled function module to,
         retrieve tenant access data associated with the plurality of tenant systems by matching the received logical tenant access parameter with tenant access parameters stored in a destination map, wherein the destination map comprises tenant access data comprising logical strings and logical addresses corresponding to the plurality of tenant systems, and
         dispatch the generated multi-tenant enabled function module call to execute on the plurality of tenant systems, based on the retrieved tenant access data.

9. The computer system of claim 8 further comprising:
an input module to receive access data associated with the central tenant system and input parameters associated with the multi-tenant enabled function module, wherein the request from the client comprises access data and input parameters.

10. The computer system of claim 9, wherein the input module receives a host name, a port name, a user name and an associated password from the client.

11. The computer system of claim 8, wherein the data receiver module retrieves user names and passwords associated with the plurality of tenant systems.

12. The computer system of claim 8, wherein the function module generator generates a remote function module.

13. The computer system of claim 8, wherein the parameter assignor module adds a destination parameter.

14. A computer-implemented method for generating a multi-tenant enabled function module comprising:
the computer accessing a remote function module stored at a central tenant system based on a request from a client to call the remote function module, wherein the request includes input parameters and the remote function module is an interface for communication between the client and tenant systems;
the computer adding a logical tenant access parameter to the remote function module, wherein the logical tenant access parameter is received in the input parameters associated with the request;
upon adding the logical tenant access parameter, the computer generating a multi-tenant enabled function module for executing plurality of tenant systems;
the computer retrieving tenant access data associated with the plurality of tenant systems by matching the received logical tenant access parameter with tenant access parameters stored in a destination map, wherein the destination map comprises tenant access data comprising logical strings and logical addresses corresponding to the plurality of tenant systems; and
based on the retrieved tenant access data, the computer dispatching the generated multi-tenant enabled function module call to execute on the plurality of tenant systems.

15. The computer-implemented method of claim 14, wherein the request from the client includes access data associated with the central tenant system, wherein the access data comprises a host name, a port name, a user name and an associated password.

16. The computer-implemented method of claim 14, wherein retrieving the tenant access data further comprises retrieving user names and passwords associated with the plurality of tenant systems.

17. The computer-implemented method of claim 14, wherein retrieving the logical strings comprises retrieving destination names.

18. The computer-implemented method of claim 14, wherein retrieving the logical addresses comprises retrieving destination addresses.

19. The computer-implemented method of claim 14, wherein adding a logical tenant access parameter comprises adding a destination parameter.

\* \* \* \* \*